US012592936B2

(12) United States Patent
Pande et al.

(10) Patent No.: US 12,592,936 B2
(45) Date of Patent: Mar. 31, 2026

(54) EXTRA SEAL OF TRUST/CONFIDENCE ON FIRST-PACKET DATA

(71) Applicant: Dell Products L.P., Round Rock, TX (US)

(72) Inventors: Pankaj Pande, Carlingford (AU); Stephen J. Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 255 days.

(21) Appl. No.: 18/189,676

(22) Filed: Mar. 24, 2023

(65) Prior Publication Data

US 2024/0323198 A1 Sep. 26, 2024

(51) Int. Cl.
*H04L 9/40* (2022.01)

(52) U.S. Cl.
CPC .......... *H04L 63/123* (2013.01); *H04L 63/126* (2013.01)

(58) Field of Classification Search
CPC ........................... H04L 63/123; H04L 63/126

USPC ........................................................ 713/168
See application file for complete search history.

(56) References Cited

U.S. PATENT DOCUMENTS

| | | | | |
|---|---|---|---|---|
| 2019/0260683 | A1* | 8/2019 | Hughes | H04L 47/00 |
| 2021/0368019 | A1* | 11/2021 | Tsukagoshi | H04L 65/65 |
| 2022/0129555 | A1* | 4/2022 | Todd | G06F 16/24568 |
| 2023/0004913 | A1* | 1/2023 | Reineke | G06Q 10/06393 |

OTHER PUBLICATIONS

Wireshark, Network Protocol Analyzer, https://www.wireshark.org/, Oct. 2, 2022.

* cited by examiner

*Primary Examiner* — Lan Dai T Truong
(74) *Attorney, Agent, or Firm* — Workman Nydegger

(57) ABSTRACT

One example method includes receiving, at a node of a data confidence fabric, a data stream, prepending, by the node, a data confidence fabric header to the data stream so as to create a prepended data stream, and the data confidence fabric header includes confidence metadata relating to the data stream, and transmitting, by the node, the prepended data stream to another node of the data confidence fabric. The confidence metadata includes metadata about hardware and/or software associated with the data in the data stream.

20 Claims, 5 Drawing Sheets

EXTRA SEAL OF TRUST/CONFIDENCE ON FIRST-PACKET DATA

FIELD OF THE INVENTION

Embodiments of the present invention generally relate to data confidence fabrics. More particularly, at least some embodiments of the invention relate to systems, hardware, software, computer-readable media, and methods for assigning confidence information to a data stream coming in to a data confidence fabric (DCF).

BACKGROUND

First packet decoding allows an application to inspect a data stream and associate the subsequent data with a particular application. This allows the data to be classified. However, there is presently no mechanism available that supports first-packet "confidence." That is, there is no mechanism that enables a data stream to not only be classified by application type, but also by the trustworthiness of the source of the data. For example, typical DCF approaches may apply confidence metadata in a "sidecar" but without altering the data stream itself.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
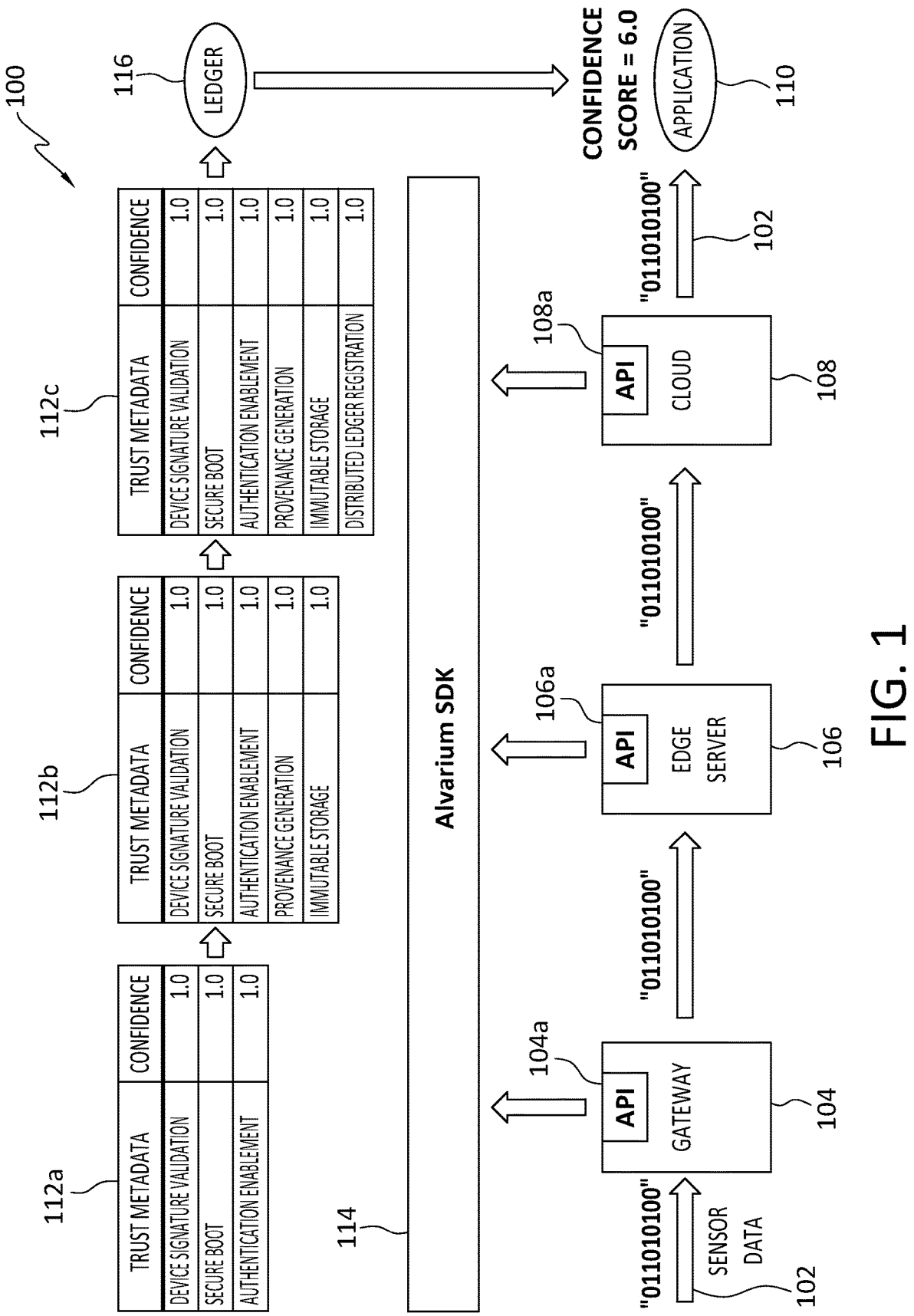
FIG. 1 discloses aspects of an example data confidence fabric.

Embodiments of the present invention generally relate to data confidence fabrics. More particularly, at least some embodiments of the invention relate to systems, hardware, software, computer-readable media, and methods for assigning confidence information to a data stream coming in to a data confidence fabric (DCF).

In one example embodiment, a data stream, such as from a sensor or edge device for example, arriving at a DCF may be examined, and confidence scores and confidence metadata assigned to the data stream. The confidence scores and confidence metadata, which may be assigned based on information and metadata known about the data stream and/or the source of the data stream, may be inserted in a DCF header that may be prepended to the front, or first packet, of the data stream. Note that while attributes of the data stream and its source may be known to the entity that generates and prepends the DCF header, those attributes may not be known to the DCF at large. Thus, when the data stream, now bearing the DCF header, arrives at nodes of the DCF, the confidence scores and metadata may be extracted from the DCF header by those nodes, and then used as a basis for the handling of the data by those nodes. In this way, the nodes of a DCF, as well as an application that consumes DCF data, may have a level of confidence as to the data in the data stream, and the source of the data stream.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that an application running at a node of a DCF may, immediately upon receipt of a data stream from another node of the DCF, be aware that the data stream and/or its source have a level of trustworthiness. As another example, an embodiment may eliminate the need for an application at a node to perform its own initial confidence assessment of a data stream and its source. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. ASPECTS OF AN EXAMPLE ARCHITECTURE AND ENVIRONMENT

The following is a discussion of aspects of example operating environments for various embodiments of the invention. This discussion is not intended to limit the scope of the invention, or the applicability of the embodiments, in any way. In general, embodiments of the invention may be implemented in connection with systems, software, and components, that individually and/or collectively implement, and/or cause the implementation of, a data confidence fabric (DCF).

With reference now to FIG. 1, embodiments of the invention may be implemented in a variety of operating environments, one example of which is a DCF denoted at 100 in FIG. 1. In general, the DCF 100 may annotate and score any data that flows within it, providing increased confidence to the applications that use that data, such as for analytical purposes for example.

As shown in FIG. 1, the example DCF 100 concerns the context of edge-based use cases, but the scope of the invention is not limited to such cases or contexts. As shown in the example of FIG. 1, data such as sensor data 102 generated by a sensor flows through one or more tiers, or layers, of the DCF. In the illustrated example, the data 102 may flow through nodes such as a gateway 104, edge server 106, and cloud ecosystem 108, and may ultimately be consumed by one or more applications 110. As trusted handling of the data 102, at the nodes of the various layers, occurs during data 102 delivery, respective trust metadata 112a, 112b, and 112c may be associated with the data 102 by those nodes, that is, by the gateway 104, edge server 106, and/or, cloud ecosystem 108. Thus, trust metadata may continue to accumulate as the data 102 passes through the various nodes in its path.

The trust metadata 112a, 112b, and 112c, may comprise, for example, respective confidence scores associated with trust insertion processes performed by the nodes with respect to the data 102. The trust metadata 112a, 112b, and 112c may be associated with the data 102 by respective node APIs (Application Program Interfaces) 104a, 106a, and 108a that communicate with an interface 114 such as an Alvarium SDK (Software Development Kit). After the data 102 has transited the various nodes, the final, comprehensive trust metadata 112c may be entered into a ledger 116 which may make the trust metadata 112c available for use by the applications 110. Note that, in this example, the trust metadata 112c is an accumulation of all the trust metadata respectively added by the gateway 104, edge server 106, and cloud ecosystem 108.

To illustrate with reference to the specific example of FIG. 1, the gateway 104 may annotate, to the data 102, respective trust metadata 112a for each of three different operations. Particularly, the gateway 104 may annotate trust metadata 112a that indicates, among other things: the gateway 104 has successfully validated the signature coming from the device that generated the data 102; the gateway 104 has used a TPM chip to confirm that the BIOS, firmware, or O/S on the gateway 104 was tampered with during boot; and, the gateway 104 is currently running authentication/authorization software to protect the data 102 stream from unwanted inspection or access. With continued reference to the trust metadata, including the trust metadata 112a, a Confidence score of "1.0" means that a trust insertion process, such as the secure boot confirmation for example, operation succeeded, while a score of "0," for example, might indicate that signature validation failed, or was not performed for some reason.

As noted earlier, the DCF metadata, that is, the trust metadata 112a, ultimately arrives at the ledger 116, where a ledger entry may be created that permanently records the contents of the trust metadata 112a table as well as an overall Confidence Score, which is 6.0 in this illustrative example. Note that the equation used to calculate the Confidence Score in the example of FIG. 1 is simply a summation of confidence scores, but other approaches to calculating an overall Confidence Score may alternatively be employed.

A useful aspect of the example DCF 100 is that, as a result of the annotation of trust metadata 112a, 112b, and 112c, the application 110 may have access to additional context about the trustworthiness of the data 102, addressing the problem of potentially untrustworthy or malicious data sources. The problems presented by such data sources is increasingly faced by enterprise customers as they move their business logic closer to non-enterprise, and potentially untrustworthy, data sources at the edge and/or elsewhere. In the example DCF 100, the path of the data 102 may be largely software-dependent, in the sense that data path handling software, which may comprise a respective instance at each of the gateway 104, edge server 106, and cloud ecosystem 108, may call an annotation/scoring API 104a, 106a, and 108a, respectively, and routing software may be provided at these nodes that forwards the annotations along the data path. However, such software dependencies in a DCF, such as the DCF 100 for example, may lead to vulnerabilities in the trustworthiness of the actual DCF metadata, that is, the trust metadata 112a, 112b, and/or 112c, for example. Examples of such potential vulnerabilities are described below.

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. Example embodiments of the invention may be applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

B. ASPECTS OF SOME EXAMPLE EMBODIMENTS

Figure 2:
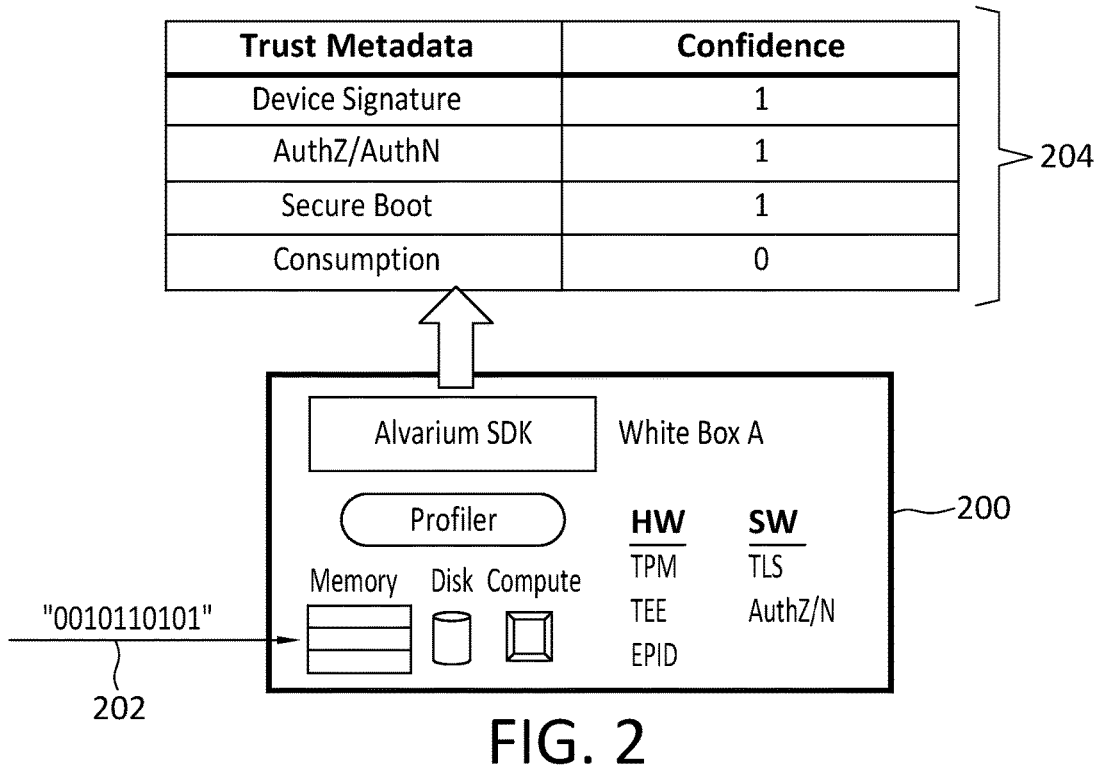
FIG. 2 discloses example confidence data/metadata that may be prepended to a data stream, according to one embodiment.

With reference now to FIG. 2, a comparative example is disclosed for aid in illustrating aspects of an example embodiment. In the example of FIG. 2, a white box component 200 receives a data stream 202 and stores confidence metadata, such as annotations and confidence scores for example, in a sidecar 204 without altering the data stream 202 itself. In contrast with this comparative example, an embodiment of the invention may alter the data stream itself to include confidence metadata, rather than simply employing a sidecar configuration such as that shown in FIG. 2.

In particular, an embodiment of the invention may prepend various confidence metadata, which may also be referred to herein as 'trust metadata,' to a data stream coming into a DCF. Once thus configured, the DCF may start encoding the network traffic with an extra seal of trust with confidence score/annotation packaged as part of the packet packaging. This may assure receiver nodes of the DCF that the data is trustworthy data and/or is coming from trusted data sources.

Figure 3:
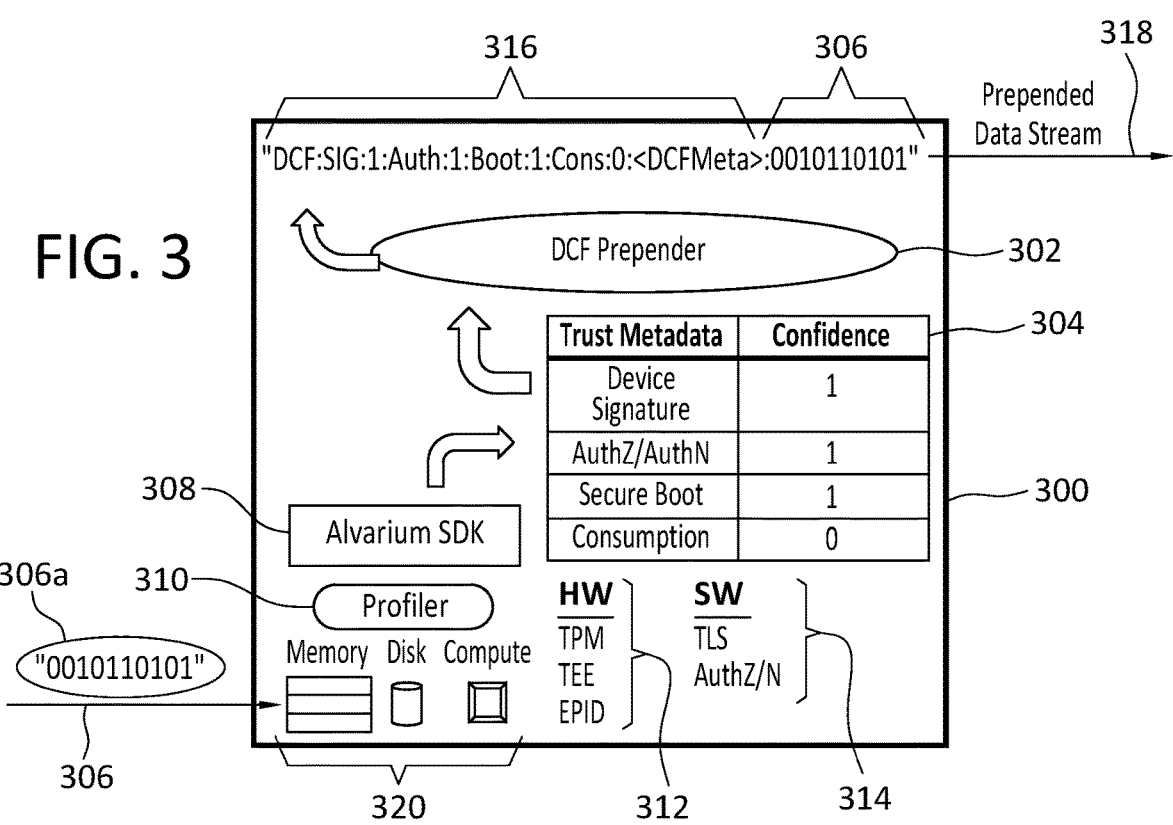
FIG. 3 discloses an architecture for prepending confidence metadata to the front of an incoming data stream, according to one embodiment.

FIG. 3 discloses an example architecture 300 that may receive, and prepend metadata to, a data stream. The example architecture 300 may comprise, or be implemented as, a node of a DCF. In another embodiment, the architecture 300 may comprise a stand alone entity configured for communication with a DCF. No particular configuration of the architecture 300 is required however.

Particularly, the example architecture 300 may comprise a DCF prepender 302 that may prepend confidence metadata 304 to an incoming data stream 306. The data stream 306 may be examined by a data confidence processor 308, such as the DellEMC Alvarium SDK for example, and the data confidence processor may generate the confidence metadata 304. To this end, the data confidence processor 308 may comprise, or operate in conjunction with, a profiler 310 in the examination of the data 306 and generation of the confidence metadata 304. As further indicated in FIG. 3, the data confidence processor 306 may, in the generation of the confidence metadata 304, consider both hardware 312 and software 314 aspects relating to the data stream 306. Examples of such hardware aspects 312 and software aspects 314 are discussed in connection with the example configuration of FIG. 1. In general then, the DCF prepender 302 may prepend the confidence metadata 304 to the front end of the data stream 306, such as in the form of a DCF header 316, to create a prepended data stream 318, that may comprise the DCF header 316 and the data stream 306, which may be passed along to one or more nodes of a DCF. When one of these other nodes receives the prepended data stream 318, that node May first receive the DCF header 316, followed by the data stream 306. It is noted that the example architecture 300 may comprise various computing resources 320, such as memory, storage disks, and processors, for carrying out its various functions.

In more detail, and with continued reference to the example of FIG. 3, the DCF prepender 302 may take the confidence metadata 304, which may comprise confidence annotations and scores, and add the confidence metadata 304 to the front of the incoming data stream 306. Particularly, a first data packet 306a '0010110101' of the data stream 306 is received at the architecture 300 which, as noted earlier, may comprise a node of a DCF. Various confidence metadata 304 may be cached locally at the architecture 300, and then prepended, in the DCF header 316, to the first data packet 306a. It is noted that additional '<DCFMeta>' may also be part of the prepending, and may be included in the DCF header 316. This additional DCF metadata may include, for example, signatures, hostnames, checksums, and any other metadata pertaining to the DCF or a data stream.

With continued reference to the example of FIG. 3, the example architecture 300 may, in an embodiment, be implemented at one, some, or all, node(s) of a DCF. Thus, multiple DCF nodes in a chain of DCF nodes may each implement respective prepending operations those nodes perform trust insertion operations and generate additional annotations. In an embodiment, the respective confidence metadata, such as the confidence metadata 304, of each node in a group of nodes may be stored in a single external ledger, or respective external ledgers such as sidecars for example, so that the confidence metadata persist immutably and may, for example, be audited at a future data, if required.

Figure 4:
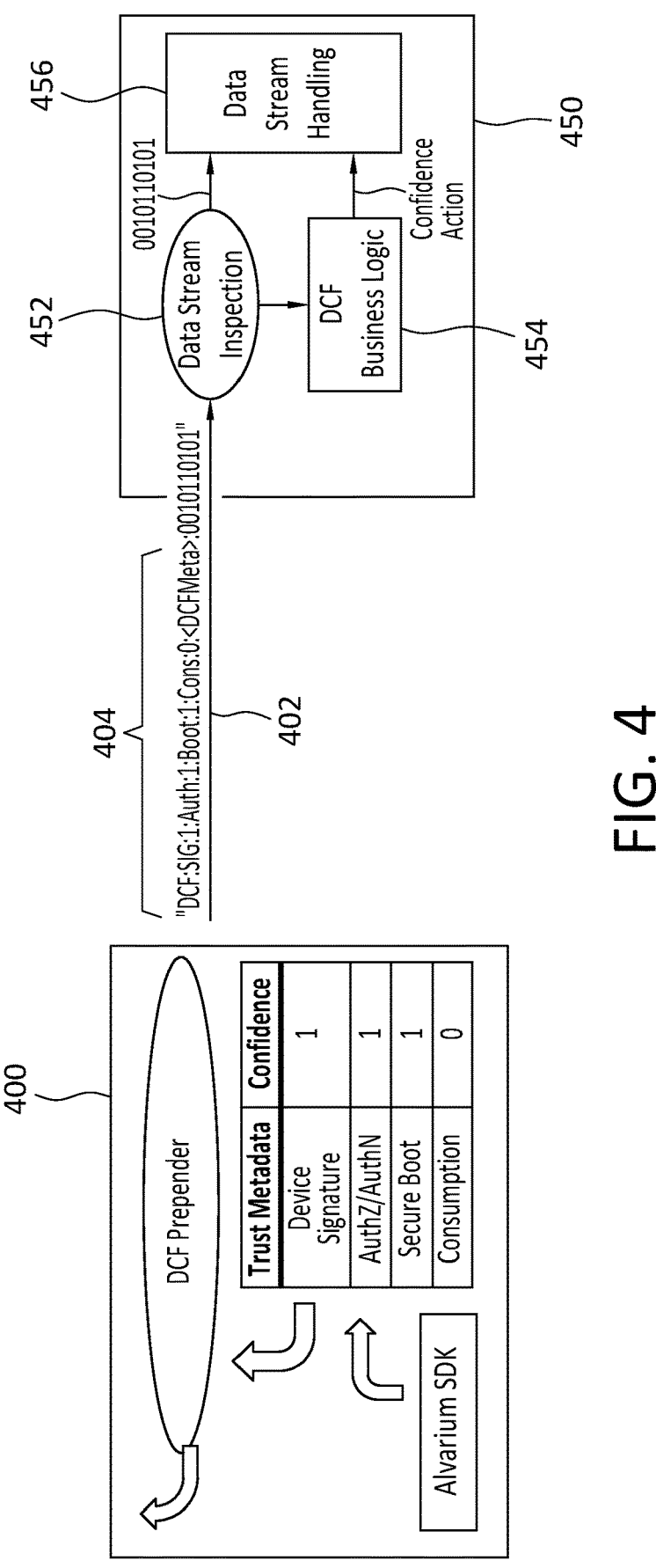
FIG. 4 discloses an approach for extracting prepended confidence metadata from a data stream, according to an embodiment.

With reference next to FIG. 4, details are provided concerning the use of the prepended metadata by a node of a DCF. In the example of FIG. 4, a DCF node 400, which may comprise an architecture that is similar or identical to the example architecture 300, may communicate with another node 450 of the DCF. In general, the node 450 may comprise logic and resources that may enable the node 450 to recognize a DCF header of a prepended data stream 402, which may also be referred to herein as a 'DCF enabled data stream,' such as may be received by the node 450 from the node 400, and to take one or more actions accordingly. In an embodiment, this recognition functionality may be implemented at the node 450 in the form of a packet analyzer platform, such as the products/services offered for sale under the WIRESHARK® mark (https://www.wireshark.org/) for example. In general, and as discussed in more detail below, the presence of prepended DCF information in a prepended data stream may immediately inform an application, running at a node that receives the prepended data stream, that the data stream can be "trusted" with some degree of confidence.

With more particular reference now to the example of FIG. 4, details are provided concerning an example technique for recognizing, and extracting, prepended confidence metadata that has been prepended to a data stream. In this example, the node 450 may comprise stream inspection logic 452 that is able to recognize, and extract, confidence metadata 404 from a prepended data stream 402. The stream inspection logic 452 may pass the extracted confidence metadata to a DCF business logic layer 454 of the node 450, which may then determine how the data of the prepended data stream 402 should be handled, a confidence action, based on the confidence metadata 404. For example, if the confidence metadata 404 indicates a relatively high confidence in the data due to the fact that a 'device signature' of '1' as opposed to '0,' as indicated at the node 400, has been assigned to a device that handled the data, then that data may be handled accordingly at the node 450. Particularly, the raw data may then be handled by a data stream handler 456, and the data processed according to the confidence action.

As this disclosure makes clear then, an embodiment of the invention may comprise the creation of a recognizable DCF header that may be prepended to a data stream, so as to allow for packet inspection applications to recognize that the data, to which the DCF header was prepended, comes from a "measurably trustworthy" source. This feature may thus enable the creation and use of business logic that may be able to process data based on confidence metadata associated with that data. Such processing may include, for example, routing of the data, analysis of the data, and consumption of the data by an application.

C. EXAMPLE METHODS

Figure 5:
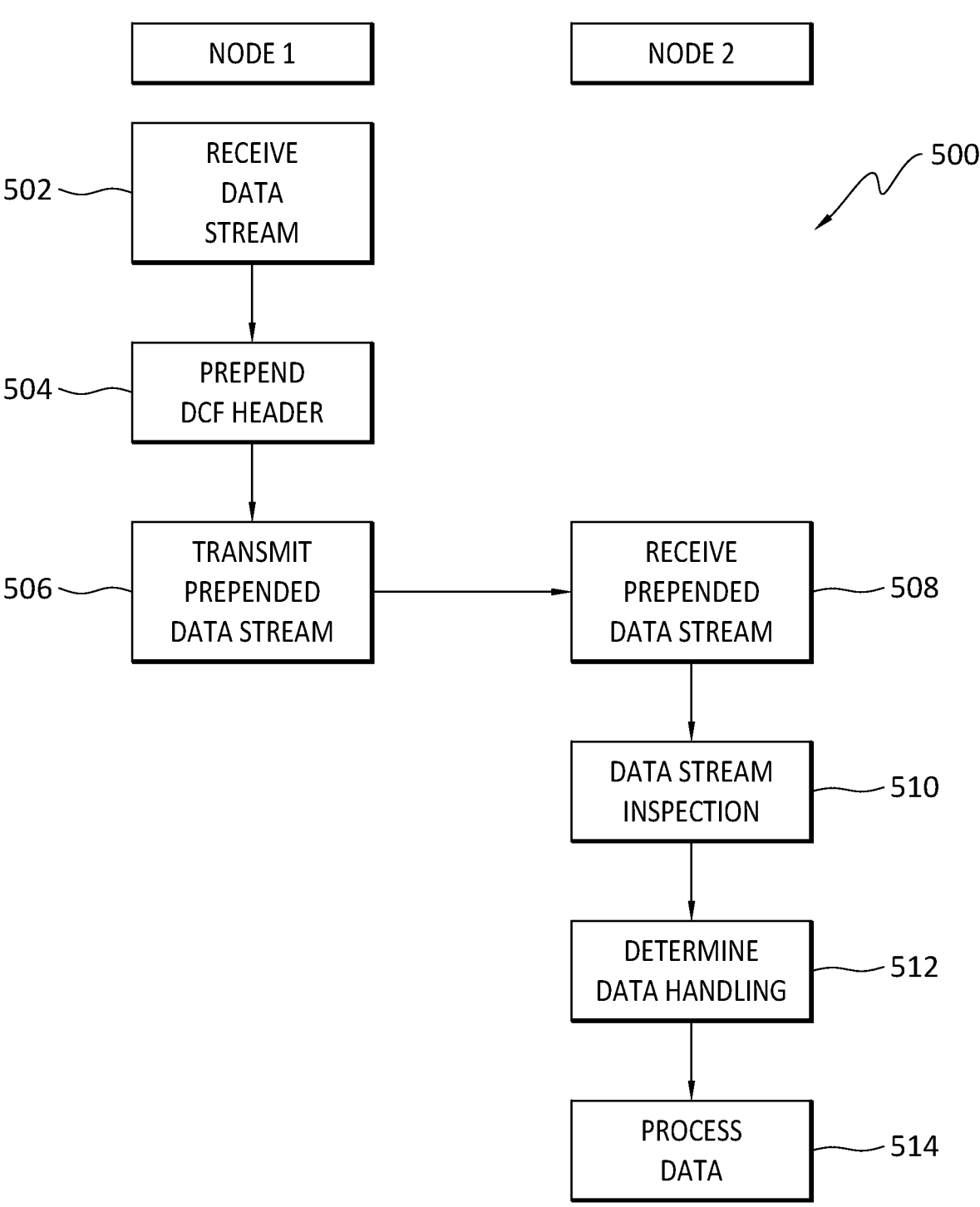
FIG. 5 discloses an example method according to an embodiment.

It is noted with respect to the disclosed methods, including the example method of FIG. 5, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 5, an example method according to one embodiment of the invention is denoted at 500. The example method 500 may begin when a node, such as a DCF node, receives 502 a data stream. The data stream 502 may be received from another node such as, for example, an edge device, a near-edge device, a gateway, or a cloud site. A DCF header may the be prepended 504 to the data stream, to define a prepended data stream that comprises the data stream and the DCF header. The prepended data stream may then be transmitted 506 to one or more nodes, such as one or more nodes of a DCF.

Another node may then receive 508 the prepended data stream. The data stream may then be inspected 510, and the inspection may involve the extraction of the DCF header, which may comprise confidence metadata. The extracted confidence metadata may then be evaluated to determine 512 how the data of the prepended data stream should be handled. The data may then be handled, processed, and/or otherwise dealt with, 514, according to the outcome of the determination 512.

Note that in an embodiment, a single node may perform the operations 502-506 with respect to one data stream. As well, that same node may perform the operations 508-514 with respect to another data stream. Thus, all of the functionalities disclosed in FIG. 5 may be implemented in a single node, though with respect to various different data streams.

D. FURTHER EXAMPLE EMBODIMENTS

Following are some further example embodiments of the invention. These are presented only by way of example and are not intended to limit the scope of the invention in any way.

Embodiment 1. A method, comprising: receiving, at a node of a data confidence fabric, a data stream; prepending, by the node, a data confidence fabric header to the data stream so as to create a prepended data stream, wherein the data confidence fabric header comprises confidence metadata relating to the data stream; and transmitting, by the node, the prepended data stream to another node of the data confidence fabric.

Embodiment 2. The method as recited in any preceding embodiment, wherein the confidence metadata relates to hardware and/or software that have handled the data stream prior to receipt of the data stream by the node.

Embodiment 3. The method as recited in any preceding embodiment, wherein the prepended data stream is configured so that the another node first receives the data confidence fabric header, followed by the data stream.

Embodiment 4. The method as recited in any preceding embodiment, wherein the confidence metadata comprises a data confidence score that was assigned to data in the data stream.

Embodiment 5. The method as recited in any preceding embodiment, wherein the data stream is a prepended data stream that includes another data confidence fabric header.

Embodiment 6. The method as recited in any preceding embodiment, further comprising receiving a prepended data stream, and extracting confidence metadata from the prepended data stream.

Embodiment 7. The method as recited in any preceding embodiment, further comprising extracting, by the node, confidence metadata from a data confidence fabric header of another prepended data stream and determining, based on the extracted confidence metadata, how data in the another prepended data stream will be handled by the node.

Embodiment 8. The method as recited in any preceding embodiment, wherein the confidence metadata in the data confidence fabric header is cached locally at the node.

Embodiment 9. The method as recited in any preceding embodiment, wherein the node is an entity that comprises hardware and/or software.

Embodiment 10. The method as recited in any preceding embodiment, wherein the data confidence fabric header is recognizable by the another node as indicating that data in the prepended data stream is associated with a measure of trustworthiness.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
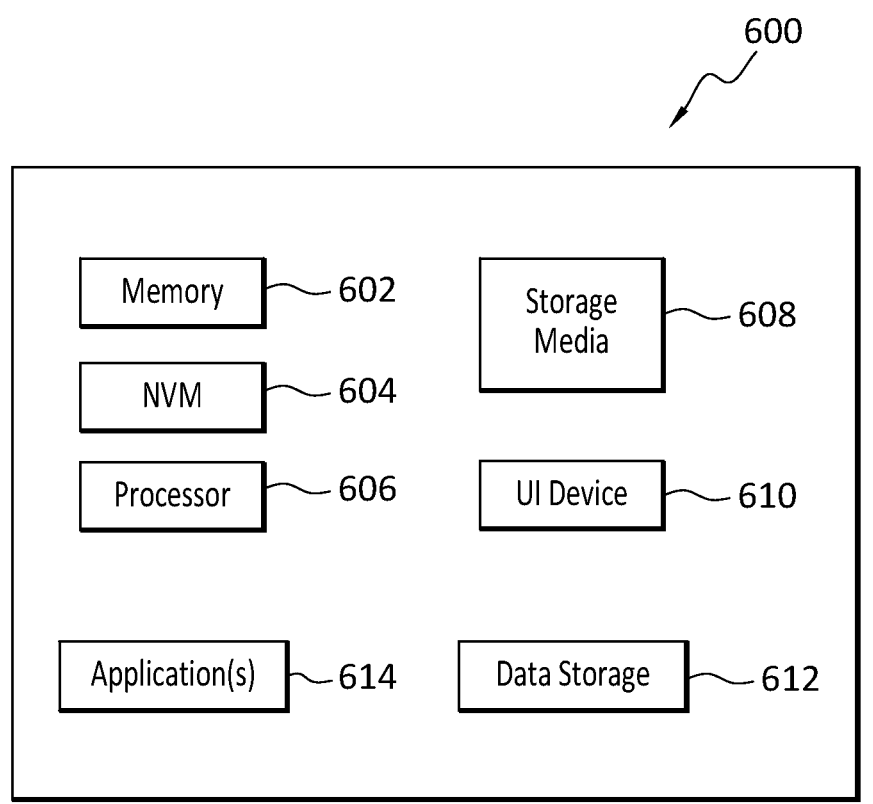
FIG. 6 discloses a computing entity configured and operable to perform any of the disclosed methods, processes, and operations.

With reference briefly now to FIG. 6, any one or more of the entities disclosed, or implied, by FIGS. 1-5, and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving, at a node of a data confidence fabric, a data stream;
altering content of the data stream by prepending, by the node, a data confidence fabric header to a first packet of the data stream so as to create a prepended data stream, wherein the data confidence fabric header comprises confidence metadata relating to the data stream; and
transmitting, by the node, the prepended data stream to another node of the data confidence fabric.

2. The method as recited in claim 1, wherein the confidence metadata relates to hardware and/or software that have handled the data stream prior to receipt of the data stream by the node.

3. The method as recited in claim 1, wherein the prepended data stream is configured so that the another node first receives the data confidence fabric header, followed by the data stream.

4. The method as recited in claim 1, wherein the confidence metadata comprises a data confidence score that was assigned to data in the data stream.

5. The method as recited in claim 1, wherein the data stream is a prepended data stream that includes another data confidence fabric header.

6. The method as recited in claim 1, further comprising receiving a prepended data stream, and extracting confidence metadata from the prepended data stream.

7. The method as recited in claim 1, further comprising extracting, by the node, confidence metadata from a data confidence fabric header of another prepended data stream and determining, based on the extracted confidence metadata, how data in the another prepended data stream will be handled by the node.

8. The method as recited in claim 1, wherein the confidence metadata in the data confidence fabric header is cached locally at the node.

9. The method as recited in claim 1, wherein the node is an entity that comprises hardware and/or software.

10. The method as recited in claim 1, wherein the data confidence fabric header is recognizable by the another node as indicating that data in the prepended data stream is associated with a measure of trustworthiness.

11. A non-transitory storage medium having stored therein instructions that are executable by one or more hardware processors to perform operations comprising:
receiving, at a node of a data confidence fabric, a data stream;
altering content of the data stream by prepending, by the node, a data confidence fabric header to a first packet of the data stream so as to create a prepended data stream, wherein the data confidence fabric header comprises confidence metadata relating to the data stream; and
transmitting, by the node, the prepended data stream to another node of the data confidence fabric.

12. The non-transitory storage medium as recited in claim 11, wherein the confidence metadata relates to hardware and/or software that have handled the data stream prior to receipt of the data stream by the node.

13. The non-transitory storage medium as recited in claim 11, wherein the prepended data stream is configured so that the another node first receives the data confidence fabric header, followed by the data stream.

14. The non-transitory storage medium as recited in claim 11, wherein the confidence metadata comprises a data confidence score that was assigned to data in the data stream.

15. The non-transitory storage medium as recited in claim 11, wherein the data stream is a prepended data stream that includes another data confidence fabric header.

16. The non-transitory storage medium as recited in claim 11, wherein the operations further comprise receiving a prepended data stream, and extracting confidence metadata from the prepended data stream.

17. The non-transitory storage medium as recited in claim 11, wherein the operations further comprise extracting, by the node, confidence metadata from a data confidence fabric header of another prepended data stream and determining, based on the extracted confidence metadata, how data in the another prepended data stream will be handled by the node.

18. The non-transitory storage medium as recited in claim 11, wherein the confidence metadata in the data confidence fabric header is cached locally at the node.

19. The non-transitory storage medium as recited in claim 11, wherein the node is an entity that comprises hardware and/or software.

20. The non-transitory storage medium as recited in claim 11, wherein the data confidence fabric header is recognizable by the another node as indicating that data in the prepended data stream is associated with a measure of trustworthiness.

* * * * *